United States Patent
Vardin et al.

(10) Patent No.: US 6,730,260 B2
(45) Date of Patent: May 4, 2004

(54) PARTS TRANSFER METHOD AND APPARATUS FOR AN INJECTION STRETCH BLOW MOLDING SYSTEM

(75) Inventors: Christian Nicholas Vardin, Toronto (CA); Stephen J. Mason, MacTier (CA)

(73) Assignee: Husky Injection Molding Systems Ltd., Ontario (CA)

( * ) Notice: Subject to any disclaimer, the term of this patent is extended or adjusted under 35 U.S.C. 154(b) by 360 days.

(21) Appl. No.: 09/982,994

(22) Filed: Oct. 22, 2001

(65) Prior Publication Data

US 2003/0075838 A1 Apr. 24, 2003

(51) Int. Cl.[7] .......................... B29C 49/06; B29C 49/64
(52) U.S. Cl. .................. 264/535; 264/538; 425/526; 425/529; 425/533; 425/534; 425/540
(58) Field of Search .................. 264/535, 538; 425/526, 529, 533, 534, 540

(56) References Cited

U.S. PATENT DOCUMENTS

| | | | | |
|---|---|---|---|---|
| 4,140,464 A | * | 2/1979 | Spurr et al. ............... | 425/534 |
| 4,310,282 A | | 1/1982 | Spurr et al. ............... | 414/753 |
| 4,344,749 A | | 8/1982 | Fritz et al. ............... | 425/174.4 |
| 4,372,910 A | | 2/1983 | Stroup et al. ............. | 264/532 |
| 4,793,960 A | | 12/1988 | Schad et al. .............. | 264/535 |
| 4,824,359 A | | 4/1989 | Poehlsen .................... | 425/534 |
| 5,424,022 A | * | 6/1995 | Koga ........................ | 425/534 |
| 5,468,443 A | * | 11/1995 | Takada et al. ............... | 425/526 |
| 5,718,853 A | * | 2/1998 | Ingram ........................ | 425/526 |
| 5,744,176 A | | 4/1998 | Takada et al. ............... | 425/526 |
| 5,902,612 A | | 5/1999 | Ogihara ........................ | 425/526 |
| 6,139,789 A | | 10/2000 | Neter et al. .................. | 264/535 |
| 6,146,134 A | | 11/2000 | Kresak et al. ............... | 432/121 |
| 6,368,099 B1 | | 4/2002 | Kresak et al. ............... | 425/526 |
| 6,409,946 B1 | * | 6/2002 | De Nardi et al. ........... | 425/533 |

FOREIGN PATENT DOCUMENTS

| | | | | |
|---|---|---|---|---|
| EP | 0300549 | | 1/1989 | ........... B29C/49/06 |
| JP | 03159726 A | * | 7/1991 | ........... B29C/49/30 |
| WO | WO9901267 A1 | * | 1/1999 | ........... B29C/49/64 |
| WO | WO0016964 A1 | * | 3/2000 | ........... B29C/49/64 |

OTHER PUBLICATIONS

PCT International Search Report mailed Dec. 10, 2002.

* cited by examiner

*Primary Examiner*—Robert B. Davis
(74) *Attorney, Agent, or Firm*—Katten Muchin Zavis Rosenman (57) ABSTRACT

The invention provides a method and apparatus for transferring parisons from an injection-molding machine to a blow-mold machine on an indexed table. The injection-molding machine creates multiple groups of parisons during an injection cycle. The groups from each cycle are transferred to the table and the blow-mold machine at the end of one interval and the beginning of a next interval so that the groups from a single injection-cycle are treated in a substantially like manner. The intervals may be of equal or unequal duration and total the length of an injection cycle.

13 Claims, 11 Drawing Sheets

SYNCHRONOUS MODE
IMM 12.0s, x [BMM 4.0s + 2s DWELL after each blow cycle]

| | CYCLE TIME (SEC.) | 0.5 | 1.0 | 1.5 | 2.0 | 2.5 | 3.0 | 3.5 | 4.0 | 4.5 | 5.0 | 5.5 | 6.0 | 6.5 | 7.0 | 7.5 | 8.0 | 8.5 | 9.0 | 9.5 | 10.0 | 10.5 | 11.0 | 11.5 | 12.0 |
|---|---|---|---|---|---|---|---|---|---|---|---|---|---|---|---|---|---|---|---|---|---|---|---|---|---|
| IMM | 1 IMM Process | IMM Process → | | | | | | | | | | | | | | | | | | | | | | | |
| | 2 Ejectors Fwd/Dwell/Back | | | | | | | | | | | | | | | | Ejectors Fwd/Dwell/Back | | | | | | | | |
| | 3 Mold Open/Turret Rotate/Mold Close | | | | | | | | | | | | | | | | | | | | | Mold Open / Turret Rotate / Mold Closed | | | |
| ROBOT | 1 Move to Photo Eye 2 | | | | | | | | | | | | | | | | | | | | | | Move to Photo eye 2 | | |
| | 2 Drop Row 2 | | Drop Row 2 | | | | | | | | | | | | | | | | | | | | | | |
| | 3 Move to Pick Position | | | Move to Pick Position | | | | | | | | | | | | | | | | | | | | | |
| | 4 Pick Dwell / Cool Jet Blow | | | | | Pick Dwell / Cool Jet Blow | | | | | | | | | | | | | | | | | | | |
| | 5 Part Transfer | | | | | | | | | | | | | | | | | Part Transfer - Shot 1 | | | | | | | |
| | 6 Move to Photo Eye 1 | | | | | | | | | | | | | | | | | | | | Move to Photo Eye 1 | | | | |
| | 7 Drop Row 1 | | | | | | | | | | | | | | | | | | | | | | Drop Row 1 | | |
| BMM | 1 Conditioning Station 1 | | Conditioning Row 1 (Cycle 2) | | | | | | | | | | Conditioning Row 1 (Cycle 2) | | | | | | | | | | | | |
| | 2 Conditioning Station 2 | | Conditioning Row 1 (Cycle 2) | | | | | | | | | | Conditioning Row 1 (Cycle 2) | | | | | | | | | | | | |
| | 1 Table Index | | | | | | | | | | | | Table Index | | | | | | | | | | | | Table Index |
| | 2 Mold Clamp & Clampup | | Mold Open & Clampup | | | | | | | | | | | Mold Open & Clampup | | | | | | | | | | | |
| | 3 Pre-Blow, Stretch, Blow & Exhaust | | | Pre-Blow, Stretch, Blow & Exhaust | | | | | | | | | | | Pre-Blow, Stretch, Blow & Exhaust | | | | | | | | | | |
| | 4 Unclamp & Mold Open | | | | | | | | | | Unclamp & Mold Open | | | | | | | | | | | | | Unclamp & Mold Open | |

FIG. 5

SYNCHRONOUS MODE

| Time | BLOW MOLD MACHINE | TABLE | ROBOT | INJECTION MOLDING MACHINE | THERMAL CONDITIONING STATION 40a | THERMAL CONDITIONING STATION 40b |
|---|---|---|---|---|---|---|
| 0.0 sec | MOLD CLOSED | TABLE STATIONARY | DROP GROUP 2 ON TABLE | GROUP 1 AND 2 PARISONS CREATED IN INJECTION UNIT | CONDITIONING GROUP 1 | CONDITIONING GROUP 2 |
| 0.75 sec | | | MOVE TO PICK POSITION AND DWELL | | | |
| 1.0 sec | GROUP 1 ARTICLES BLOWN | | | | | |
| 2.75 sec | MOLD IDLE | | 7.25 sec | | | |
| 4.75 sec | | TABLE INDEXED | | | | |
| 5.5 sec | MOLD OPEN | | | | STATION OFF | STATION OFF |
| 6.0 sec | MOLD CLOSED | TABLE STATIONARY | | | CONDITIONING GROUP 2 | CONDITIONING GROUP 1 |
| 8.25 sec | GROUP 2 ARTICLES BLOWN | | REC GROUP 1 & 2 FROM INJ. UNIT AND ROTATE | MOLD OPENED TURRET ROTATED AND MOLD CLOSED | | |
| 8.75 sec | | | MOVE TO POS. TO DROP GROUP 1 | | | |
| 9.5 sec | MOLD IDLE | | DROP GROUP 1 ON TABLE | | | |
| 10.0 sec | | | | | | |
| 10.5 sec | | | ROBOT IDLE | | | |
| 10.75 sec | | | | | | |
| 11.5 sec | MOLD OPEN | TABLE INDEXED | | | STATION OFF | STATION OFF |
| 12.0 sec | | | | | | |

FIG. 6

| | CYCLE TIME (SEC.) | 0.5 | 1.0 | 1.5 | 2.0 | 2.5 | 3.0 | 3.5 | 4.0 | 4.5 | 5.0 | 5.5 | 6.0 | 6.5 | 7.0 | 7.5 | 8.0 | 8.5 | 9.0 | 9.5 | 10.0 | 10.5 | 11.0 | 11.5 | 12.0 |
|---|---|---|---|---|---|---|---|---|---|---|---|---|---|---|---|---|---|---|---|---|---|---|---|---|---|
| IMM | 1 IMM Process | IMM Process - SHOT 2 | | | | | | | | | | | | | | | | | | | | | | | |
| | 2 Ejectors Fwd/Dwell/Back | | | | | | | | | | | | | | | | | Ejectors Fwd / Dwell / Back | | | | | | | |
| | 3 Mold Open/Turret Rotate/Mold Close | | | | | | | | | | | | | | | | | | | | | Mold Open / Turret Rotate / Mold Closed | | | |
| ROBOT | 1 Move to Photo Eye 2 | | | | | | | | | | | | | | | | | | | | | | | Move to Photo eye 2 | |
| | 2 Drop Row 2 | | | | | | | | | | | | | | | | | | | | | | | | |
| | 3 Move to Pick Position | | | | | | | | | | | | | | | | | | | | | | | | |
| | 4 Pick Dwell / Cool Jet Blow | | | | | | | | | | | | | | | | | | | | | | | | |
| | 5 Part Transfer | | | | | | | | | | | | | | | | | Part Transfer - Shot 1 | | | | | | | |
| | 6 Move to Photo Eye 1 | | | | | | | | | | | | | | | | | | | | Move to Photo Eye 1 | | | | |
| | 7 Drop Row 1 | | | | | | | | | | | | | | | | | | | | | | Drop Row 1 | | |
| BMM | 1 Conditioning Row 1 Station 1 | | | | | | | | | | | | | | | | | | | | | | | | |
| | 2 Conditioning Row 1 Station 2 | | | | | | | | | | | | | | | | | | | | | | | | |
| | 1 Conditioning Row 2 Station 1 | | | | | | | | | | | | | | | | | | | | | | | | |
| | 2 Conditioning Row 2 Station 2 | | | | | | | | | | | | | | | | | | | | | | | | |
| | 1 Table Index | | | | | | | | | | | | | | | | | | | | | | | | Table Index |
| | 2 Mold Clamp & Clampup | | | | | | | | | | | | | | | | | | | | | | | | |
| | 3 Pre-Blow, Stretch, Blow & Exhaust | | | | | | | | | | | | | | | | | | | | | | | | |
| | 4 Unclamp & Mold Open | | | | | | | | | | | | | | | | | | | | | | | | |

FIG. 7A

ASYNCHRONOUS MODE
IMM 12.0s, x [BMM 4.0s + 4.0s DWELL AT END OF 2nd blow cycle]

| CYCLE TIME (SEC.) | 12.5 | 13.0 | 13.5 | 14.0 | 14.5 | 15.0 | 15.5 | 16.0 | 16.5 | 17.0 | 17.5 | 18.0 | 18.5 | 19.0 | 19.5 | 20.0 | 20.5 | 21.0 | 21.5 | 22.0 | 22.5 | 23.0 | 23.5 | 24.0 |
|---|---|---|---|---|---|---|---|---|---|---|---|---|---|---|---|---|---|---|---|---|---|---|---|---|
| IMM | | | | | | | | | | | | | | | | | | | | | | | | |
| 1) IMM Process | | | | | | | | | | | | | | | | | | | | | | | | |
| 2) Ejectors Fwd/Dwell/Back | | | | | | | | | | | | | | | | | Ejectors Fwd / Dwell / Back | | | | | | | |
| 3) Mold Open/Turret Rotate/Mold Close | | | | | | | | | | | | | | | | | | | | | Mold Open / Turret Rotate / Mold Closed | | | |
| ROBOT | | | | | | | | | | | | | | | | | | | | | | | | |
| 1) Move to Photo Eye 2 | | | | | | | | | | | | | | | | | | | | | | Move to Photo eye 2 | | |
| 2) Drop Row 2 | Drop Row 2 | | | | | | | | | | | | | | | | | | | | | | | |
| 3) Move to Pick Position | | | Move to Pick Position | | | | | | | | | | | | | | | | | | | | | |
| 4) Pick Dwell / Cool Jet Blow | | | | | Pick Dwell / Cool Jet Blow | | | | | | | | | | | | | | | | | | | |
| 5) Part Transfer | | | | | | | | | | | | | | | | | Part Transfer - Shot 1 | | | | | | | |
| 6) Move to Photo Eye 1 | | | | | | | | | | | | | | | | | | | | Move to Photo Eye 1 | | | | |
| 7) Drop Row 1 | | | | | | | | | | | | | | | | | | | | | | Drop Row 1 | | |
| BMM | | | | | | | | | | | | | | | | | | | | | | | | |
| 1) Conditioning Row 1 Station 1 | Conditioning SHOT 1, Row 1 in conditioning station1 | | | | | | | | | | | | | | | | | | | | | | | |
| 2) Conditioning Row 1 Station 2 | | | | | | | | | Conditioning SHOT 1, Row 1 in conditioning station2 | | | | | | | | | | | | | | | |
| 1) Conditioning Row 2 Station 1 | | | | | | | | | Conditioning SHOT 1, Row 2 in conditioning station1 | | | | | | | | | | | | | | | |
| 2) Conditioning Row 2 Station 2 | | | | | | | | | | | | | | | | | | | | | | | | |
| 1) Table Index | | | | | | | Table Index | | | | | | | | | | | | | | | | | Table Index |
| 2) Mold Clamp & Clampup | | | | | | | | | | | | | | | | | | | | | | | | |
| 3) Pre-Blow, Stretch, Blow & Exhaust | | | | | | | | | | | | | | | | | | | | | | | | |
| 4) Unclamp & Mold Open | | | | | | | | | | | | | | | | | | | | | | | | |

ASYNCHRONOUS MODE

| Time | BLOW MOLD MACHINE | TABLE | ROBOT | INJECTION MOLDING MACHINE | THERMAL CONDITIONING STATION 40a | THERMAL CONDITIONING STATION 40b |
|---|---|---|---|---|---|---|
| 0.0 sec | MOLD CLOSED | TABLE STATIONARY | DROP GROUP 2 ON TABLE | GROUP 1 AND 2 PARISONS CREATED IN INJECTION UNIT | CONDITIONING GROUP 1 | CONDITIONING GROUP 2 |
| 0.75 sec | GROUP 1 BLOWN | | | | | |
| 1.0 sec | | | MOVE TO PICK POSITION AND DWELL | | | |
| 2.75 sec | MOLD OPEN | | | | | |
| 3.5 sec | | TABLE INDEXED | | | | |
| 4.0 sec | MOLD CLOSED | TABLE STATIONARY | | | | |
| 4.75 sec | GROUP 2 BLOWN AND MOLD KEPT CLOSED | | | | | |
| 8.25 sec | | | REC GROUP 1 & 2 FROM INJ. UNIT AND ROTATE | | CONDITIONING GROUP 2 | CONDITIONING GROUP 1 |
| 9.5 sec | | | MOVE TO POS. TO DROP GROUP 1 | | | |
| 10.0 sec | MOLD OPEN | | | MOLD OPENED TURRET ROTATED AND MOLD CLOSED | | |
| 10.5 sec | | | DROP GROUP 1 | | | |
| 10.75 sec | | | ROBOT IDLE | | | |
| 11.5 sec | | TABLE INDEXED | | | | |
| 12.0 sec | | | | | | |

PARTS TRANSFER METHOD AND APPARATUS FOR AN INJECTION STRETCH BLOW MOLDING SYSTEM

BACKGROUND OF THE INVENTION

1. Field of the Invention

The present invention broadly relates to a parts transfer system for an integrated injection molding and blow molding system.

The key concept to this invention is that two groups of parisons in a single set of parisons arrive at the blow-molding unit in nearly the same condition. This is achieved by staggering the indexing of the table in order to enable different sections of the table to remain at different stations around the table for differing time intervals and/or by moving related sets of parisons from station to station in rapid succession to one another. With the staggered indexing of the table each set of parisons remains on the table for periods of time that are sufficiently similar to ensure that each set of parisons reaches the blow mold clamp in a similar condition. The movement of related sets of parisons within minimal separation intervals also enables related sets of parisons to arrive at a blow-molding unit in similar condition.

2. Summary of the Prior Art

U.S. Pat. No. 4,793,960 to Schad et al (incorporated herein by reference) describes a system for transferring parisons carried on pallets through conditioning stations before entering a finishing or blow molding station. In this system, all parisons from an injection cycle are transferred simultaneously to a plurality of pallets that are then fed sequentially to the blow molding station. With this system, each pallet carrying parisons remains in the transfer path for a different period of time thus requiring different temperature conditioning for each set of parisons on a pallet.

U.S. Pat. No. 5,753,279 to Takada et al (incorporated herein by reference) describes an injection stretch blow molding apparatus in which the array pitch of the preforms is changed so that the preforms can be blown in a blow mold. The patent does not disclose means for ensuring minimal temperature differential between parisons reaching the blow molding machine.

U.S. Pat. No. 5,744,176 to Takada et al (incorporated herein by reference) describes a parison transfer system where each parison travels through a heating section and a standby section before entering the blow molding section. The transfer system operates synchronously.

U.S. Pat. No. 5,902,612 to Ogihara (incorporated herein by reference) describes an injection stretch blow molding apparatus which includes an injection unit which forms a set of parisons during an injection cycle which is a multiple of the number of parisons that can be blown in a blow molding machine during each cycle. The transfer of parts from the injection molding machine to the blow molding machine is synchronous.

U.S. Pat. No. 4,310,282 to Spurr et al (incorporated herein by reference) describes a parison transfer system that has storage means for storing parisons while they are awaiting transfer to a blow molding station. The patent does not provide means for asynchronously transferring parisons so as to ensure their arrival at a blowing station in substantially the same condition.

U.S. Pat. No. 4,824,359 to Poehlsen (incorporated herein by reference) describes a parison transfer system that operates synchronously to transfer parisons from an injection molding station to a blow molding station.

U.S. Pat. No. 6,139,789 to Neter et al (incorporated herein by reference) describes a system for thermally conditioning each batch or set of parisons in a like manner by holding each batch in a separate conditioning unit. The patent does not suggest transporting the sets of parisons through transfer stations in a like manner.

U.S. Pat. No. 6,146,134 to Kresak et al (incorporated herein by reference) describes a transfer system for transferring parisons from an injection molding station to a blow molding station that includes adjustable temperature conditioning stations in the transfer path. The transfer table moves synchronously.

U.S. Pat. Nos. 5,501,589 and 5,578,262 to Marcus (each incorporated herein by reference) describe a transfer apparatus that uses an axially and laterally indexed platen to transfer the parisons. The system provides a multiple number of blow stations corresponding to the number of injection cavities in the injection-molding unit.

U.S. Pat. No. 5,509,796 to Settembrini (incorporated herein by reference) describes a preform transfer system where the preforms are blown into bottles. The preforms that have been held the longest on the transfer path are blown first. By blowing the bottles in reverse order to their travel time on the transfer system, the effects of variations in the characteristics of the preforms can be minimized.

U.S. Pat. No. 5,443,360 to Lamb et al (incorporated herein by reference) describes a synchronous transfer system for transferring a sub-multiple of the injection molded parisons to a blow molding machine during each molding cycle.

None of the prior art references address the problem of temperature deviation in separate sets of parisons arriving at the blow molding station. In some cases, the problem would not occur because there is a one-to-one correspondence between the injection molding unit and the blow-molding unit. In these cases, each parison is treated equally. In other cases, the temperature change in the parisons remains within an acceptable window during the transfer process and would not create a problem. In still other cases, the problem may not have been recognized and a certain amount of waste product was expected and accepted.

There are a number of problems and deficiencies with the known prior art devices. When transferring parts from an injection molding machine directly to a blow molding machine it is essential that the parts arrive at the blow molding machine in a uniform or similar condition. With injection molding machines that inject more than one group of parts at a time, the parts are sometimes delivered to the blow-molding machine with different temperature profiles. If these profiles are significantly different, the blown parts may have significantly different configurations. As the object is to create consistent parts, this is obviously unacceptable machine performance. In practice, it has been found that, for many parts, the temperature decay during transfer is acceptable and the parts still arrive at the blow-molding machine in sufficiently similar condition that the subsequently blown parts will be consistent with one another. However, this is not the case with all parts. In particular, parisons that require longer cycle times or are formed of particular materials, such as polypropylene that has a lower tolerance for temperature change, need to arrive at the blow molding station with little temperature variation. The present invention enables uniform blown parts to be generated for all types of parisons. The invention is achieved by enabling the parts transfer device to operate in a synchronous or asynchronous mode dependent on the character of the parison being created by the injection-molding machine.

SUMMARY OF THE INVENTION

The general aspect of the present invention is to provide an improved method and apparatus for transferring parts from an injection molding machine to a blow molding machine.

Another aspect of the present invention is to transfer parts from an injection molding machine to a blow molding machine where each part arrives at the blow molding machine in a substantially similar condition.

The foregoing aspects are achieved by providing a novel transfer system and method for transferring groups of parisons from an injection molding unit to a blow molding unit where the injection molding unit generates a plurality of groups of parisons simultaneously. The transfer mechanism transfers the parisons from the injection-molding unit to the blow-molding unit in such a way that each parison in each group of parisons is treated in a like manner. Each set of parisons is dropped from an arm of a robot attached to the injection-molding unit onto a transfer pallet on the transfer mechanism and transported to the blow-molding machine. The blow-molding machine is operated to receive and simultaneously blow each parison in each group of parisons with a minimal cycle time between blowing operations for each group of parisons from a single set of parisons. Each group of parisons is held in the transfer apparatus for an interval that is substantially the same for every group of parisons. This ensures that each individual parison arrives at the blow molding station in essentially the same condition.

The foregoing aspects are further achieved by providing a transfer table for an injection stretch blow mold system where the injection unit simultaneously injects a plurality of groups of parisons during an injection cycle and the blow molding unit blows a single group of blown articles during a blow molding cycle and the injection molding cycle is longer than the blow molding cycle by a factor which is greater than or equal to two. The transfer table includes means for indexing the transfer table through a plurality of stations.

The stations include a receiving station for receiving parisons from the injection unit, a blow station for blowing the parisons into blown articles, at least a first intermediate station between the injection station and the blow station and at least a second intermediate station between the blow station and the injection station, and means for operating the indexing means asynchronously to enable a pallet on the table to be held at a station for pre-selected intervals. The pre-selected intervals are selected so as to enable each group of parisons to remain in the at least first and second intermediate stations for an aggregate interval of time that is substantially equal for each group of parisons and to enable each group of parisons from a single injection cycle to be moved into the blow station in rapid succession.

The foregoing aspects are further achieved by providing, in an injection stretch blowing system comprising an injection unit for injecting a plurality of groups of parisons simultaneously, transfer means for transferring parisons to an index table a group at a time, an index table for transporting the transferred group of parisons through a plurality of stations and a blow molding machine at one of the stations, the blow molding machine simultaneously blowing a single group of the parisons into blown articles, the table being indexed at predetermined times and remaining stationary between the predetermined times, an improved parison transfer method comprising the steps of transferring a first group of parisons from a first injection cycle to the table immediately prior to indexing of said table, blowing, in the blow molding machine, a first group of parisons from another injection cycle into blown articles immediately prior to indexing of the table, transferring a second group of parisons from the first injection cycle to the table immediately after indexing of the table, and blowing, in the blow molding machine, a second group of parisons from the another injection cycle into blown articles immediately after indexing of the table.

Further objects and advantages of the present invention will appear hereinbelow.

BRIEF DESCRIPTION OF THE DRAWINGS

Embodiments of the present invention will now be described, by way of example only, with reference to the attached figures, wherein

FIGS. 7A to 7D combine to show a timing diagram for moving a two groups of parisons from a single injection cycle through the machine shown in FIG. 1 when operated in an asynchronous mode.

DETAILED DESCRIPTION OF THE PREFERRED EMBODIMENTS

Figure 1:
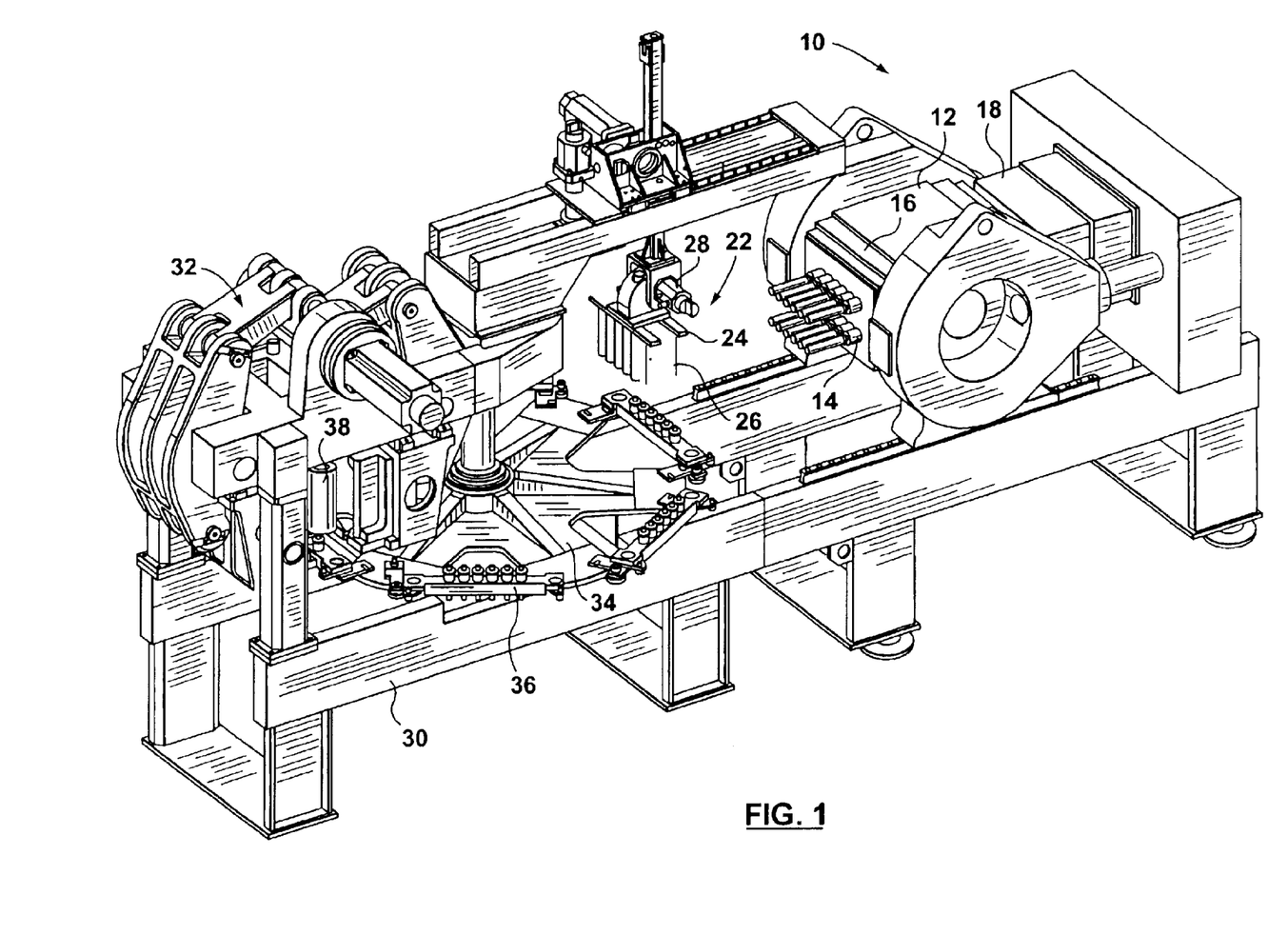
FIG. 1 is an isometric view of a blow-molding machine attached to an index-molding machine through a parts transfer conveyor.

Referring to the drawings, FIG. 1 illustrates an index injection molding machine 10 containing a two face index mold 12 having a plurality of mold cores 14 on each of its faces 16 and 18. In the embodiment shown, each face 16 and 18 has twelve mold cores 14 thereon, however, any suitable number of mold cores 14 could be provided.

The index injection molding machine 10 is used to mold parisons 20 (see FIG. 3) in a known manner. The molded parisons 20 are presented to a robot 22 for removal from the cores 14 at the rear of the machine 10. The robot 22 has a tooling plate 24 with a plurality of carrier tubes 26 mounted at a matching pitch to the injection cores 14. The number of carrier tubes 26 on the tooling plate 24 equals the number of mold cores 14 on one face of the mold. The tooling plate 24 is mounted on a ninety degree pivoting head 28 so that after removal of the parisons 20 from the cores 14, while the cores 14 are in a horizontal position, the carrier tubes 26 can be turned to a vertical position with the tubes 26 containing the parisons 20 neck downward. The parisons 20 are held in the tubes 26 by application of a vacuum in a known manner. The vacuum holding system does not form part of the present invention and therefore is not described in detail.

Attached to the rear of the base 30 of the machine 10 is a blow molding machine attachment 32 which includes, in addition to the robot assembly 22, a six position horizontal rotatable table 34, with parison carrying pallets 36 mounted at each of six equispaced positions. An electric servo driven clamp 38 is mounted at one of the positions for stretch blow molding parisons.

Figure 2:
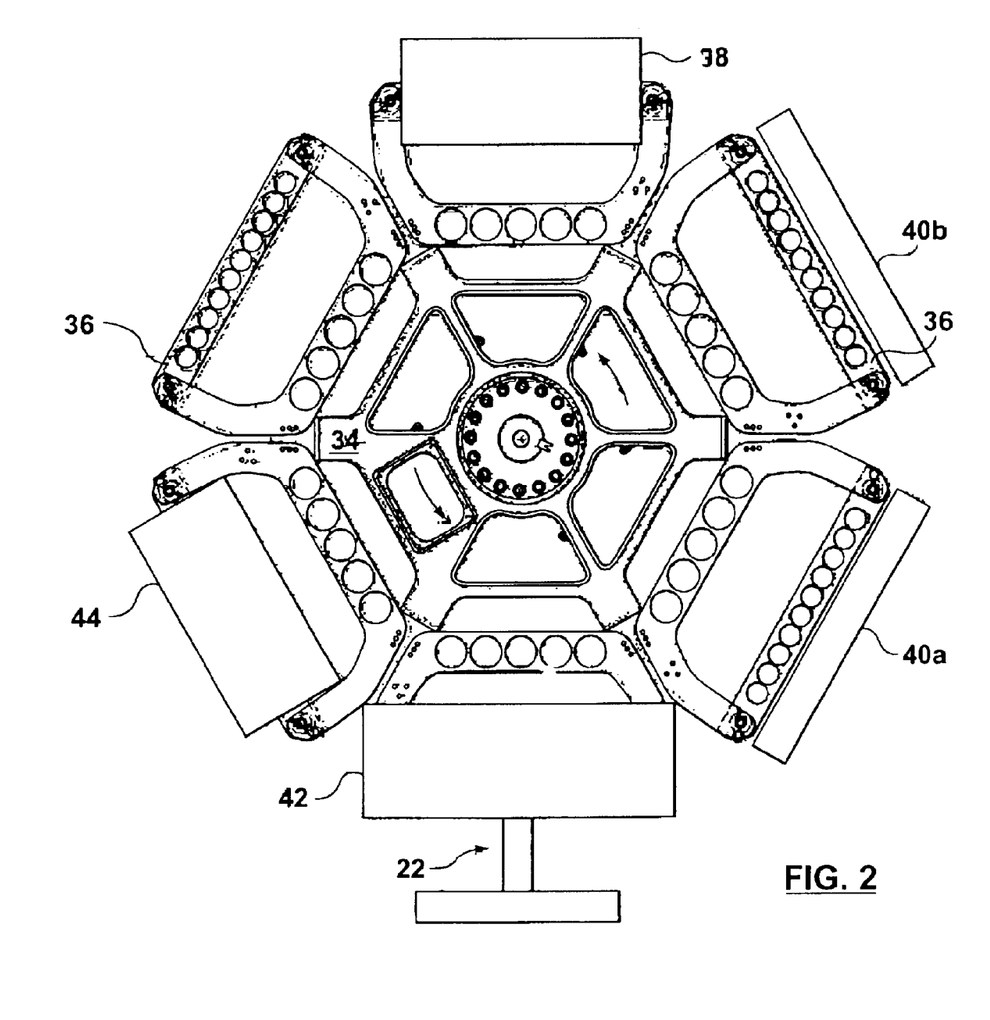
FIG. 2 is a plan view of a rotary table used as a parts transfer conveyor for the machine of FIG. 1 showing the stations around the table.

Referring to FIG. 2, the rotary table 34 includes a loading station 42 at which the robot 22 loads batches of parisons 20 onto the individual pallets 36. As shown in this figure, two of the positions preceding the blow molding station 38 are occupied by thermal conditioning stations 40a and 40b. The conditioning stations 40a and 40b are used to adjust the thermal profile of the parisons where necessary. The position immediately following the blow molding station 38 is an open station that is followed by a stripper station 44 for removing the blown articles from the pallets 36. FIG. 2 schematically illustrates the relative positions of these stations.

In FIG. 2, each of the pallets 36 is shown without parisons 20 or blown articles situated thereon. In actual operation, each pallet 36 would be loaded with parisons 20 or blown articles. More particularly, parisons 20 would be on or being transferred onto a pallet 36 at the robot station 22 and parisons 20 would be positioned on the pallets 36 at the two conditioning stations 40a and 40b and in the blow molding station 32. Blown articles would be positioned on the pallets 36 at the idle station and eject station 44.

The rotation of the table 34 is indexed from station to station so as to optimize the production efficiency of both the injection molding and stretch blow molding processes, for given cavitation combinations of injection molds and blow molds. The table 34 may be rotated by a direct frameless servo electric drive, servo driven belt drive or any other known drive means 46 (see FIG. 4) of sufficient speed and positional accuracy.

Figure 3:
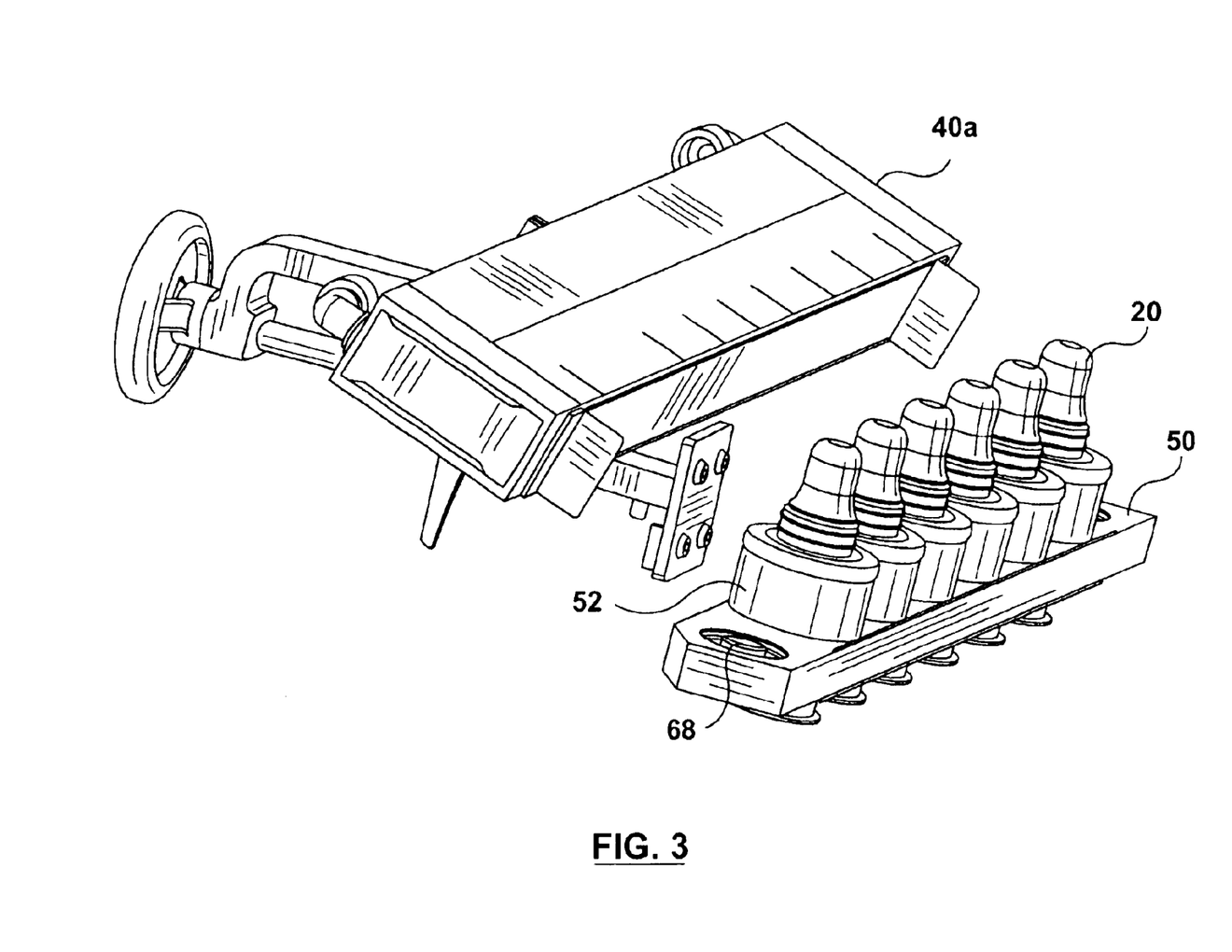
FIG. 3 is an isometric view of a pallet assembly used for holding the parts while on the conveyor and an associated temperature-conditioning unit.

FIG. 3 shows a pallet 36 adjacent a conditioning station 40a. The thermal conditioning stations 40a and 40b are movable transversely and vertically in a manner well known to those skilled in the art. This enables the thermal conditioning to be tailored to the requirements of the particular parisons being processed.

Figure 4:
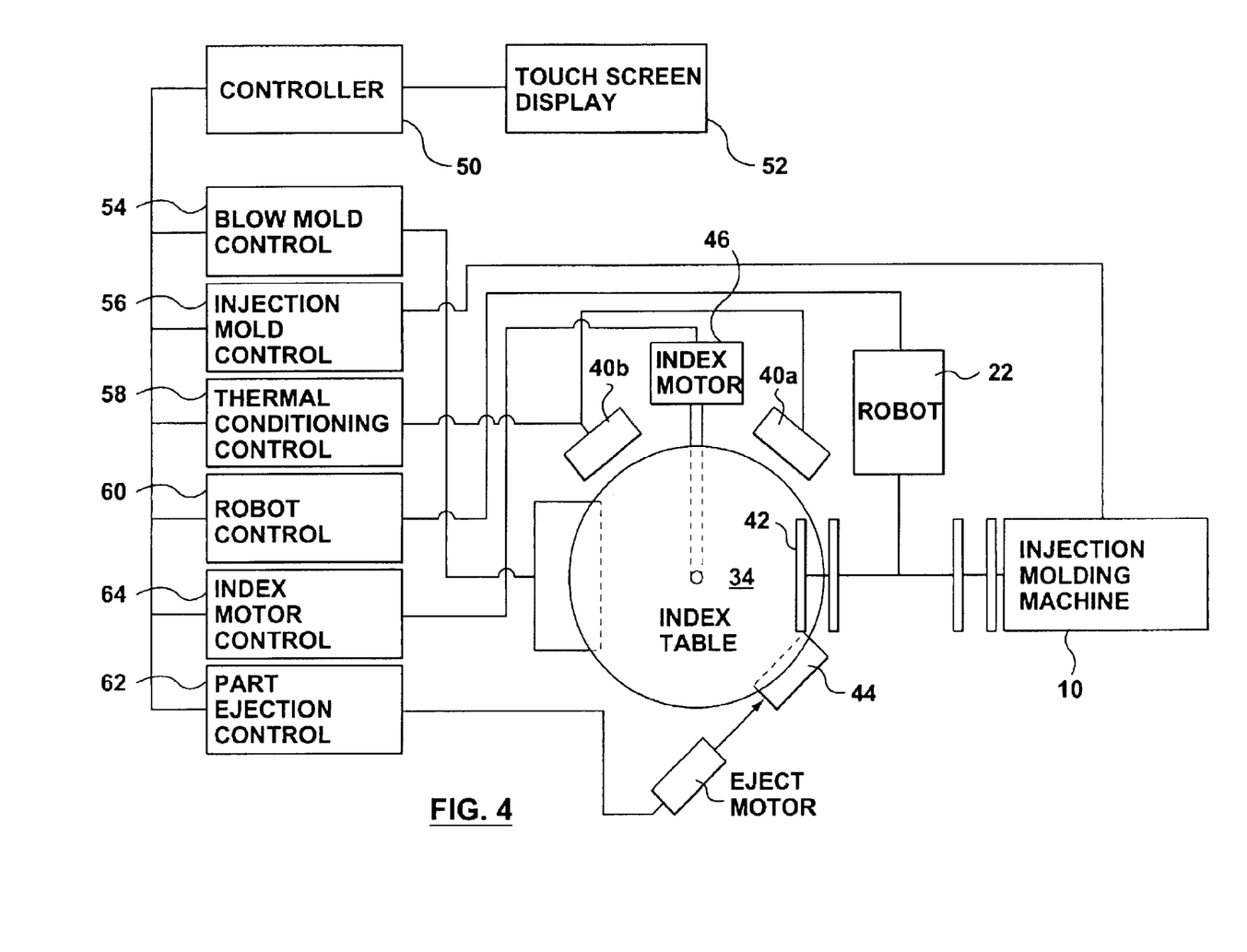
FIG. 4 is a schematic drawing of a control system for controlling an injection stretch blow-molding machine in accordance with the present invention.

As shown in FIG. 4, a system controller 50 provides control signals to the components of the injection stretch blow molding system in a preprogrammed timed sequence. The controller 50 also provides status information to a touch screen display panel 52 that enables an operator to intervene in the operation of the system as required. The operator control aspect of the system will not be described as it is unrelated to the operation of the present invention.

The factor that limits the productivity of the injection blow molding system is the length of the injection cycle needed to form the parisons 20. In the embodiment described herein, the injection cycle takes about twelve seconds to create and deliver parisons 20 to the table 36. The blow-molding machine can blow the parisons 20 into blown articles in 3.5 seconds. Consequently, it is desirable to enable the blow-molding machine to perform at least two blow mold cycles for every injection molding cycle. In the present embodiment, this is achieved by providing twice as many injection cavities in the injection unit as there are blow mold cavities in the blow-molding machine. This requires that the injection unit provide two groups of parisons to the table 34 for each injection cycle in order to enable the blow molding machine to perform two blow molding cycles while the injection unit is performing a single injection cycle. If the parisons 20 are transferred to the table 36 at a regular interval, it is obvious that each set of parisons would be on the transfer table and at different stations around the table for different intervals of time. In many cases, this would lead to unsatisfactory blown articles because the parisons would arrive at the blow-molding machine 32 with different characteristics. The present invention enables the parisons 20 to arrive at the blow-molding machine 32 in sufficiently similar condition so that a uniform blown article can be obtained from each parison 20.

As shown in FIG. 4, the controller 50 provides operational signals to a blow mold control device 54, an injection mold control device 56, a thermal conditioning unit control device 58, a robot control device 60, an index motor control device 64 and a blown article ejection device 62.

The signals may be from an analog or digital controller. A digital controller is preferred.

The blow mold control device 54 receives signals from the controller 50 that enable it to control the opening, closing, clamping and blowing of parisons 20 in the blow molding machine 32 at the desired times during the processing cycle.

The injection mold control device 56 receives signals from the controller 50 that enable it to control the opening, closing, clamping, injection and turret rotation of the injection molding machine 10.

The thermal conditioning control device 58 receives signals from the controller 50 that enable the device 58 to move the thermal conditioning units 40a and 40b into or out of operative association with the parisons 20 on a pallet 36. The control device 58 also receives signals enabling it to raise or lower the thermal conditioning units 40a and 40b to enable the unit to condition the desired portion or portions of the parisons 20.

The index motor control device 64 receives signals from the controller 50 that enable it to control the drive motor 46 to thereby rotate the table 34 at the appropriate times during the processing cycle.

The article ejection control device 62 receives signals from the controller 50 enabling it to eject blown articles from the table 34 when the blown articles reach the ejection station 44.

The sequence of operations for the system, when operated in the synchronous mode will now be described with reference to the timing diagram shown in FIG. 5 and the operational diagram shown in FIG. 6.

The reference to synchronous and asynchronous mode refers to the table indexing operation. In the synchronous mode, the table 34 is indexed at regular intervals. In the asynchronous mode, the table 34 is indexed at differing intervals.

Figure 5:
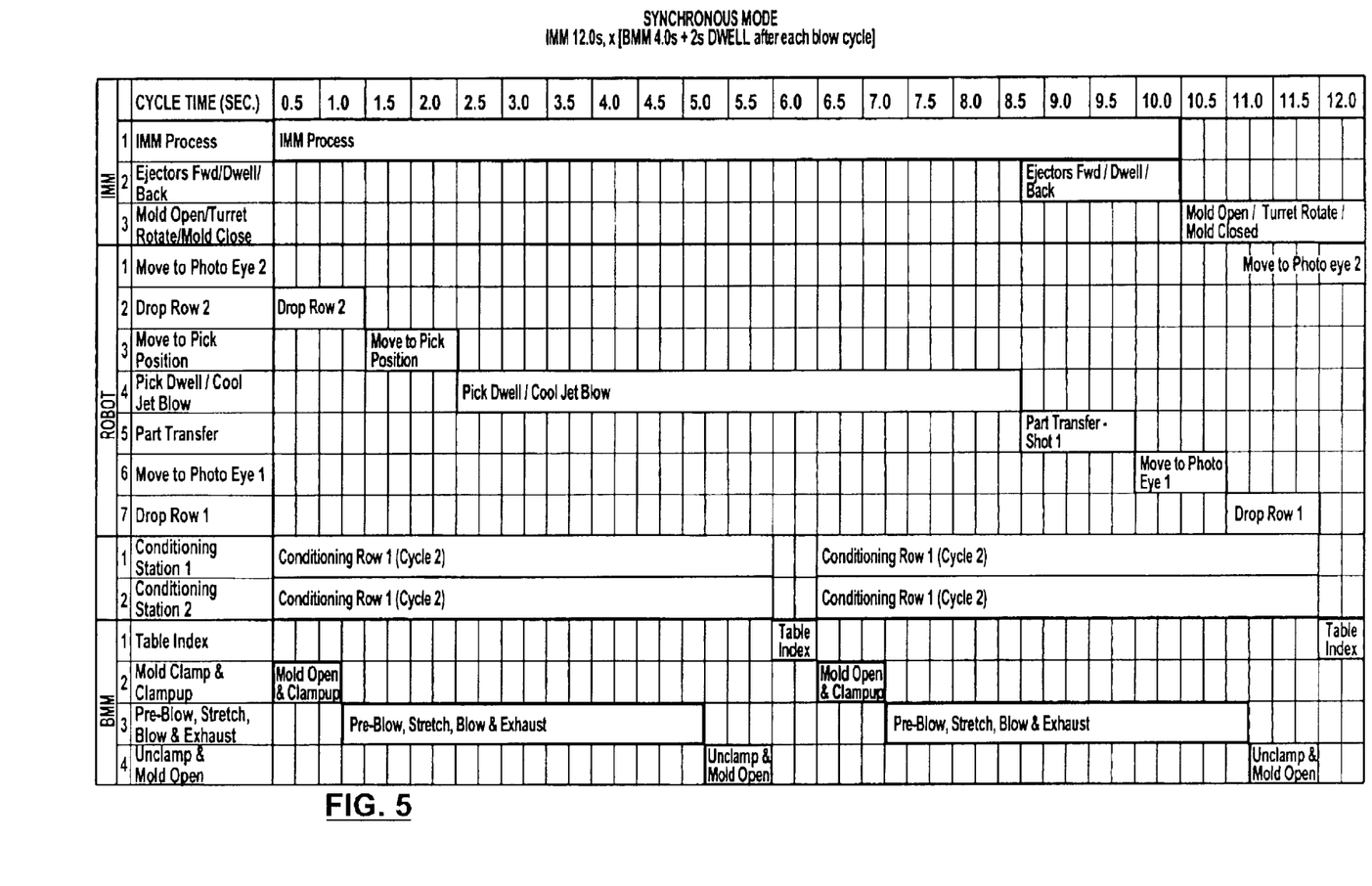
FIG. 5 is a timing diagram for the machine shown in FIG. 1 when operated in a synchronous mode.
Figure 6:
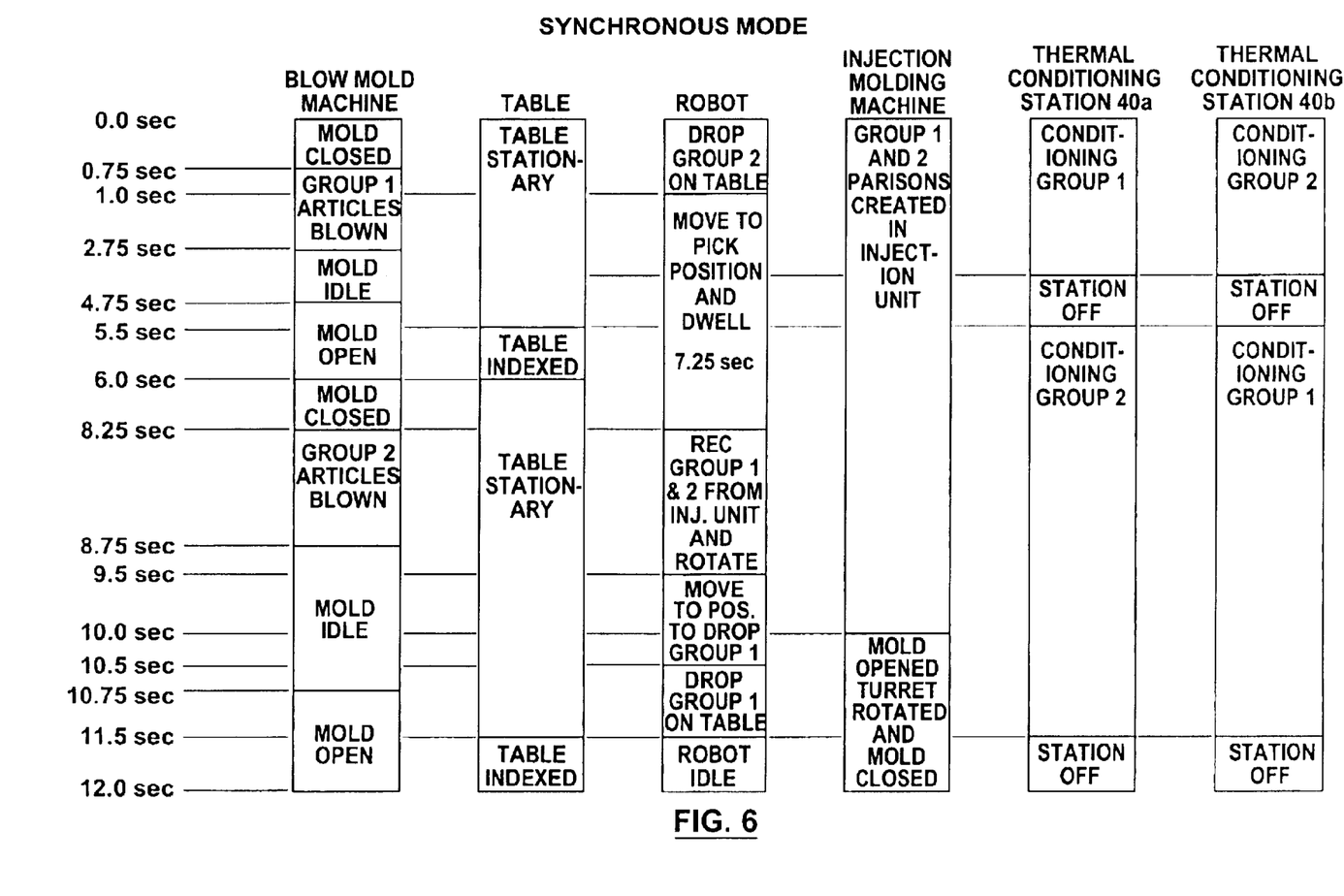
FIG. 6 is a step-by-step operational diagram of the control process for controlling the transfer mechanism for the machine shown in FIG. 1 when operated in a synchronous mode.

FIG. 5 shows a typical cycle time diagram when the machine is being operated in the synchronous mode. In this particular example, the complete injection molding cycle takes 12 seconds whereas a blow molding cycle can be completed in 3.5 seconds. With this arrangement, two groups of parisons 20 can be blow molded while the injection-molding machine 10 is performing a single injection cycle. To minimize wasted cycle time in the blow-molding machine 32, two sets of parisons 20 are formed in the injection unit 10 during each injection cycle. This requires that the two groups of parisons 20 be dropped onto separate pallets 36 at different times so that the pallets 36 can be fed into the blow-molding machine 32 in sequence. To accomplish this, the table 34 is indexed so that a first empty pallet 36 is disposed under a first row of tubes 26 holding parisons 20. The first group of parisons 20 is then dropped into the empty pallet 36. The table 34 is then indexed to bring the next empty pallet 36 into position under the arm of the robot 22. During this index operation, the arm of the robot 22 is moved laterally to move the second group of pallets 20 into position over the newly indexed empty pallet 36.

In the diagram shown in FIG. 5, the twelve-second-cycle time has been subdivided into quarter second intervals. The activity performed by the indexed system shown in FIG. 1 during each of these quarter-second intervals is identified by the legend on the left side of FIG. 5. The first three lines on the diagram illustrate the activity of the injection-molding machine (IMM) 10. The next seven lines indicate the activity performed by the robot 22. The next two lines indicate the activity at conditioning stations 40a and 40b. The last four lines indicate the operation of the blow molding machine (BMM) 32 in cooperation with the table indexing apparatus 46. For ease of understanding, the operation of each unit will be described individually although it should be clearly understood that many of the operations are performed simultaneously at the times indicated in FIG. 5.

In the example, the injection molding process is indicated as initiated at the beginning of the cycle and not completed until ten seconds of the cycle has transpired. During the interval between 8.5 seconds and 10.0 seconds, parison ejectors are moved into position to transfer parisons 20 on the mold core 14 to the tooling plate 24 on the robot 22 that has been rotated into its pick position during the interval between 1 and 2 seconds as shown at line three for the robot 22. This transfer procedure is well known in the art and will not be further described herein. This cycle is repeated every twelve seconds.

The operation of the robot 22 will now be described. At the beginning of each cycle, robot 22 is in position to drop a second group of parisons 20 onto mandrels 52 (see FIG. 3) on a pallet 36. After the parisons 20 have been transferred to the tooling plate 24 the pivoting head 28 is rotated ninety degrees so as to place the parisons 20 in a vertical position. The robot 22 is then positioned so that the plate 24 is properly aligned with a pallet 36. In the present example, two sets of photo eyes are used to align the plate 24. The first photo eye aligns the first group of parisons 20 with the pallet 36 as indicated at line six for the robot 22. When the photo eye detects alignment, the first group of parisons 20 is dropped onto a pallet 36. Immediately upon depositing the first group of parisons 20 onto a pallet 36, the table is indexed a single position to bring another empty pallet 36 into position under the pivoting head 28. The tooling plates 24 are repositioned into alignment with the second photo eye and the second group of parisons are immediately dropped onto a pallet 36. The two groups of parisons 20 are now in position to be indexed around the rotatable table to the blow-molding machine 32. The 2.0 second dwell may be with the mold open, or closed with high air pressure. The dwell may be operator selected for either open or closed.

The synchronous operation of the injection stretch blow molding system will be better understood when described with reference to FIG. 6. FIG. 6 illustrates the sequence of operations that occur in the blow molding machine 32, conditioning stations 40a and 40b, transfer station 42 and the injection molding station 10 during a single twelve second injection molding cycle in the injection molding unit 10.

At the start of the cycle, the blow mold clamp 38 on the blow molding machine 32 is closed, a second group of parisons 20 from a previous injection cycle of the injection unit 10 is transferred to mandrels 52 on a pallet 36 at the transfer station 42, a second group of parisons 20 from an injection cycle prior to the previous injection cycle is held in the second conditioning station 40b and a first group of parisons 20 from the previous injection cycle is held in the first conditioning station 40a. The first group of parisons 20 from the injection cycle prior to the previous injection cycle are held within the blow mold clamp 38 and are blown into articles.

Although the blow molding process can be completed in about 3.5 seconds, the blow mold is kept closed for about 5.5 seconds. As the table will not be indexed during this interval, the blow mold can remain closed without interfering with the operation of the table 34.

The conditioning units 40a and 40b may remain active during the entire interval or any portion thereof or may be entirely inactive. The operation of the thermal conditioning units 40a and 40b is determined by the requirements of the particular parisons 20 being transported on the table 34.

The blow mold clamp 38 is unclamped and opened about 5.5 seconds after it was clamped and closed. The table 34 can be indexed when the blow mold clamp 38 is open.

After indexing the table 34, the blow clamp 38 closes and clamps the blow mold to blow the second group of parisons from the injection cycle prior to the previous injection cycle into blown articles.

The robot 22 remains in position to transfer the parisons 20 to a pallet 36 but does so as late in the index interval as possible. This enables the two groups of parisons 20 from the same injection cycle to be dropped onto a pallet 36 within a minimal time interval since the first group is dropped at the end of an index interval and the second group is dropped at the beginning of an index interval.

With this arrangement, both groups of parisons 20 are transferred to the table 34 within a minimal intervening interval.

In operation, the first group of parisons 20 from an injection cycle remain at the transfer station 42 for about a second, at the first conditioning station 40a for about 5.5 seconds, at the second conditioning station 40b for about 5.5 seconds and the blow molding machine 32 for another 5.5 seconds. The second group of parisons 20 remains at the transfer station 42 for about five seconds and at each of the conditioning stations 40a and 40b and the blow molding station 32 for about six seconds.

When the table is indexed after receiving the first group of parisons 20, the first group is brought into position adjacent the first conditioning station 40a. In this operation, the first group of parisons 20 is dropped onto a pallet 36 and the table is immediately indexed to enable the second group of parisons 20 to be dropped onto a second pallet 36. The table is then only indexed after 4.5 seconds have elapsed. This means that the second group of parisons 20 remains in the transfer station 42 for 4.5 seconds longer than the first group of parisons 20. While the operation of the conditioning stations 40a and 40b can compensate for the difference in dwell time at the transfer station 42 for most parisons, it cannot do so for all types of parisons. Accordingly, some mechanism is required to ensure that each of the two groups of parisons 20 is treated equally. This can be achieved by indexing the table asynchronously which operation will be described hereinafter.

When the table is indexed a second time, the first group of parisons 20 is positioned adjacent the second conditioning station 40b and the second group of parisons 20 is positioned adjacent the first conditioning station 40a. In this operation, each group of parisons is kept adjacent each conditioning station for the same interval of time so each parison 20 is conditioned in a like manner. Immediately upon being conditioned in the second conditioning station 40b, the parisons 20 are fed into the blow molding station 32 and are blow molded into the desired article as quickly as is possible.

For most applications, the difference in the time at which the two groups of parisons 20 rest at the transfer station 42 is inconsequential as the time they are held at the conditioning stations 40a and 40b is sufficient to enable any differences in temperature conditioning to be temporized to the point that uniform articles can be blown from each group. However, with some parisons and some injecting materials, the requirements to obtain a uniform product are so stringent that even this small variation in treatment of the two groups of parisons cannot be tolerated. In the case where the variations must be limited, the table 34 can be indexed asynchronously to ensure that each group of parisons is treated in a like manner. This asynchronous operation will be described hereinafter with reference to FIGS. 7A to 7D and 8.

While the synchronous indexing of the transfer table is satisfactory for many parisons, it can create unacceptable temperature variations is some parisons. For example, in the case of polypropylene parisons, a very slight difference in the temperature of the parison entering the blow-molding unit can result in blown articles having significantly different characteristics. The present invention provides a satisfactorily uniform blown article by indexing the transfer table 34 asynchronously to ensure that each group of parisons from a single set of parisons is treated substantially equally. The asynchronous movement of the table 34 enables the two groups of parisons 20 to be delivered to the transfer station 42 and the blow molding station 32 in rapid succession. The difference in time between delivering the two sets of parisons is only limited by how quickly the table 34 can be indexed.

FIGS. 7A to 7D illustrate the treatment of two injection shots. Of course, in normal operation, each of the six pallets on the index table would be active so that three pallets would be carrying parisons, two pallets blown articles, and one pallet would be empty.

FIGS. 7A to 7D illustrate the timing cycle for converting two injection shots from an injection unit 10 into blown articles. In this particular application, the overall cycle takes 48 seconds to complete, however, two groups of parisons and two groups of blown articles are produced every twelve seconds. The limiting factor on the output remains the length of time necessary to perform the injection operation since the blow molding operation can be completed in a much shorter time.

Figure 7A:
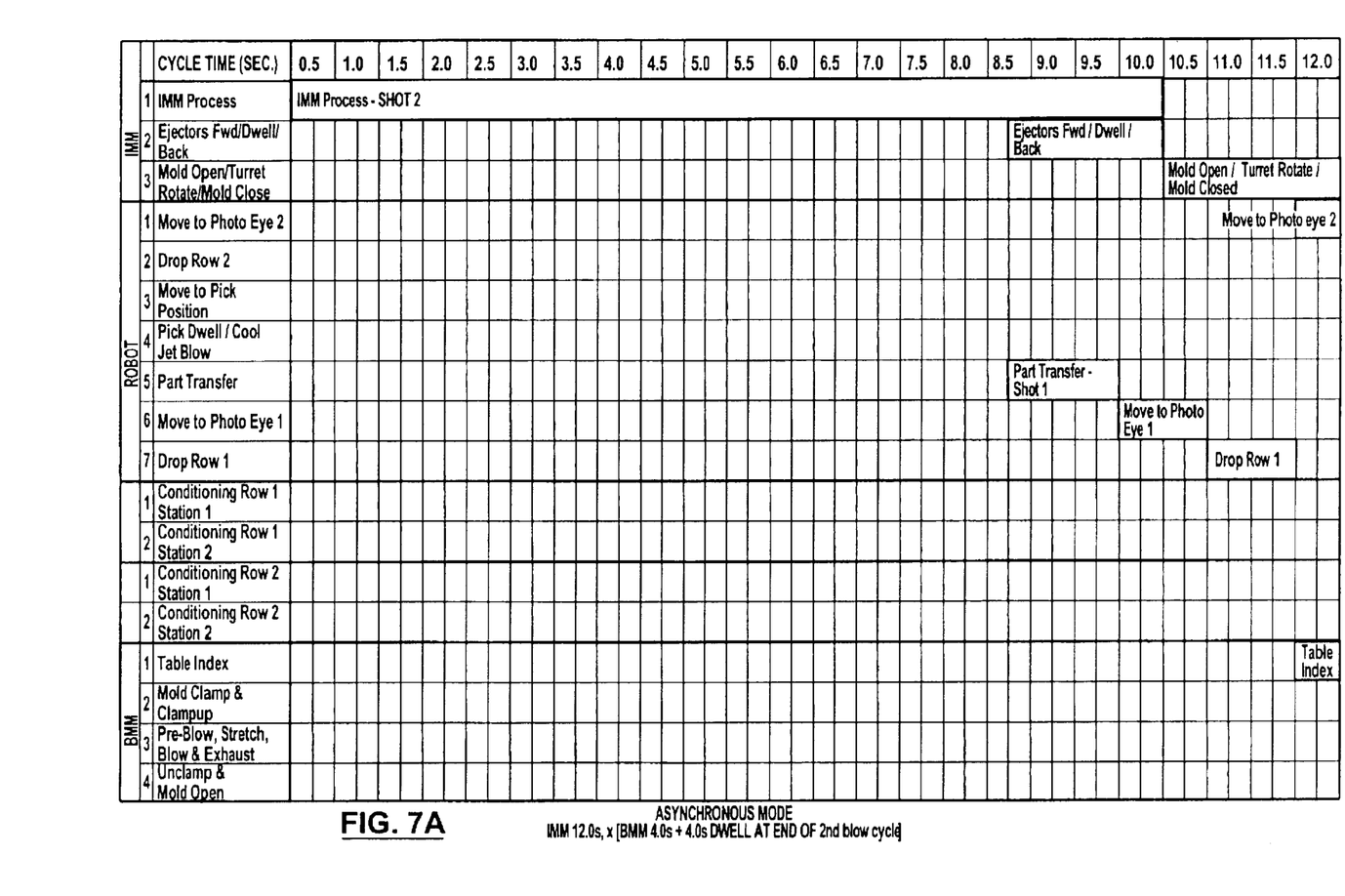

As shown in FIG. 7A, it takes twelve seconds to complete an injection cycle in the injection-molding unit 10. During this time, the parisons 20 from a previous injection cycle are held in position to be transferred to the robot 22. At the 8.5 second point, the two groups of parisons 20 from shot 1 are transferred to the robot 22 and the arm of the robot 22 is rotated ninety degrees and positioned to drop the first group of parisons 20 from shot 1 onto a pallet 36. The injection mold 12 is then opened and the turret rotated so as to position the two groups of parisons 20 from shot 2 in position to be received by the tooling plates 24. The table 34 is now indexed to rotate the pallets 36 through one position. At the same time the arm of the robot 22 is lined up so that the second group of parisons 20 from shot one can be dropped onto a pallet 36 as soon as the table 34 is indexed. In this way, both groups of parisons 20 from shot one are dropped onto the pallets 36 in quick succession.

Figure 7B:
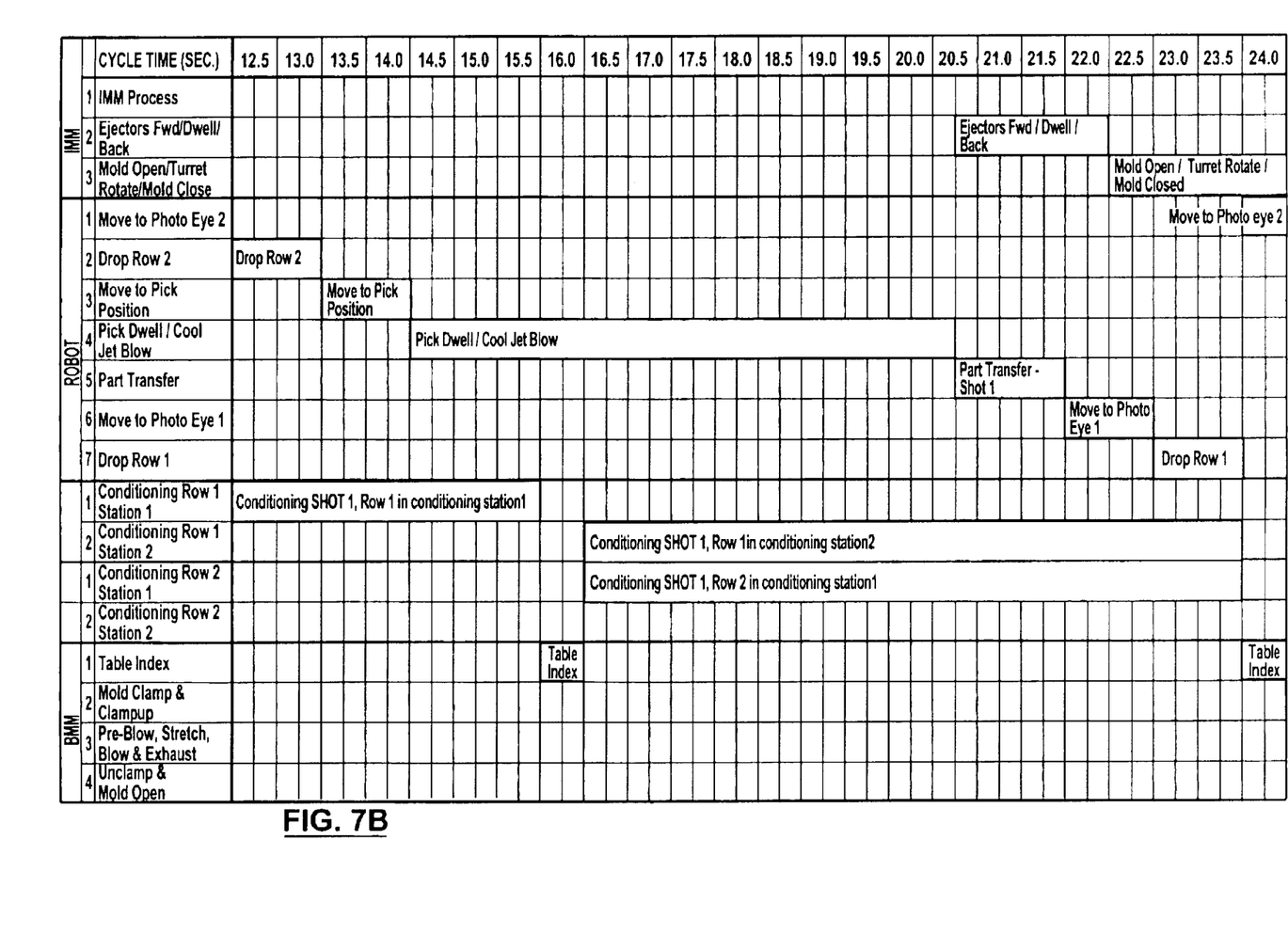

During the next interval, which is 3.5 seconds long, the first group of parisons 20 from shot 1 is conditioned at the first conditioning station 40a while the second group of parisons 20 from shot 1 is dropped onto a pallet 36. After dropping the second group of parisons 20, the arm of the robot 22 is rotated back into position to receive the two groups of parisons 20 from the second shot in the tooling plates 24. However, the parisons are not actually transferred to the tooling plates 24 at this time because they have not cooled sufficiently to be moved.

After this 3.5-second interval, the table 34 is again indexed. The first group of parisons 20 from shot one are indexed to the second conditioning station 40b and the second group of parisons 20 from shot one are indexed to the first conditioning station 40a. This interval lasts 7.5 seconds. About midway through this interval, the two groups of parisons 20 from shot 2 are cooled sufficiently to enable them to be transferred to the tooling plates 24. The tooling plates 24 receive the two groups of parisons 20 from shot two and the arm of robot 22 rotates ninety degrees. The arm of robot 22 is now positioned to drop the first group of parisons 20 from shot 2 onto a pallet 36 on the index table 34. After the first group of parisons 20 from shot 2 have been dropped, the table 34 is indexed and the arm of the robot 22 moved to line up the second group of parisons 20 from the second shot with an incoming pallet 36 on the index table 34.

Figure 7C:
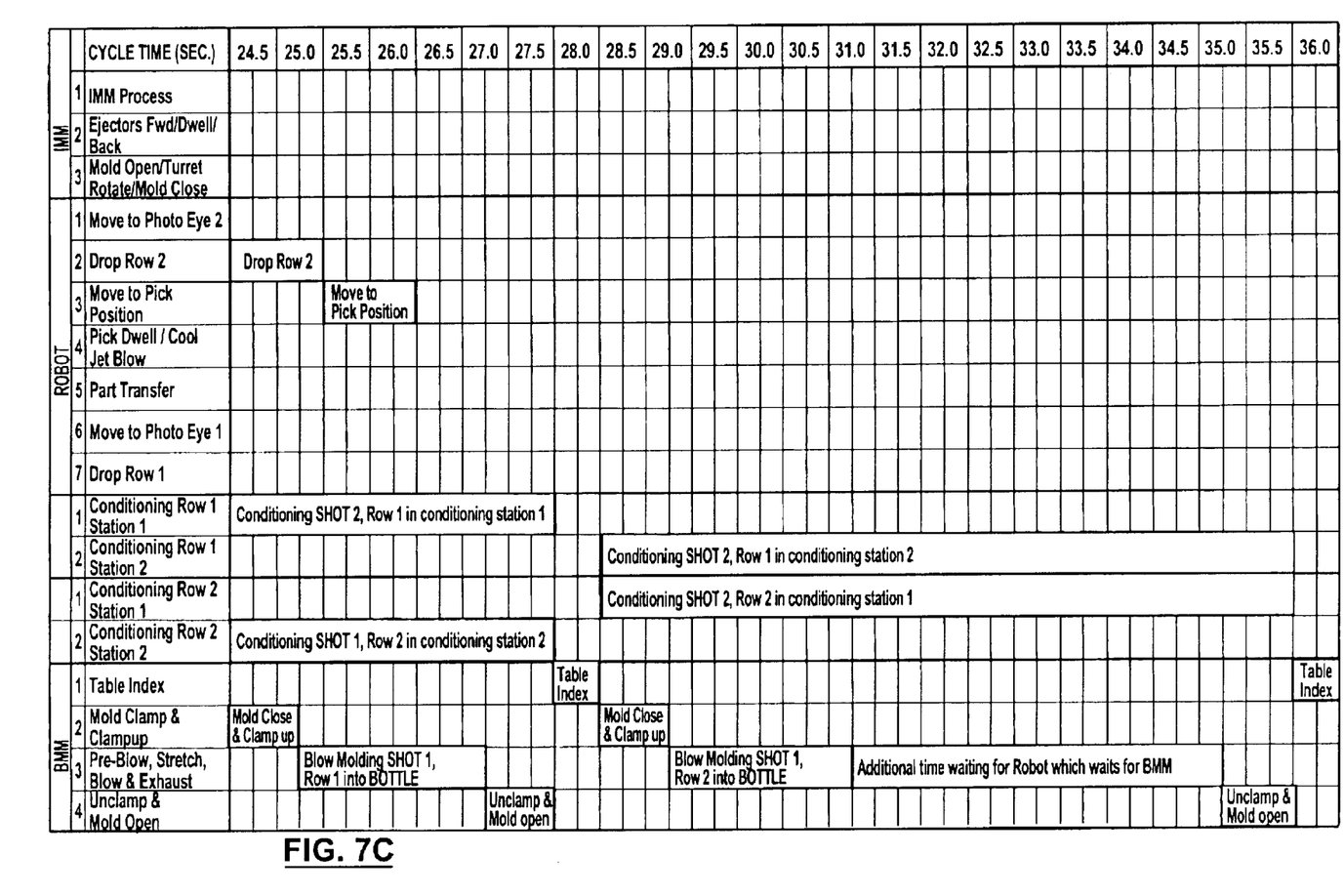

This next interval lasts 3.5 seconds. During this interval, the second group of parisons 20 from shot 2 is dropped onto a pallet 36 and the robot 22 is rotated ninety degrees back into a position where tooling plates 24 can receive parisons 20 from a third shot. The second group of parisons 20 from shot one are in the second conditioning station 40b and the first group of parisons 20 from shot two are at the first conditioning station 40a. The first group of parisons 20 from shot one is blown into the desired blown article in the blow-molding machine 32. At the end of this cycle, the blow-molding machine clamp 38 is opened to enable the table 34 to be indexed.

The next interval lasts 7.5 seconds. At the beginning of this interval the blow mold clamp 38 is closed and the second group of parisons 20 from shot 1 are immediately blown. In this way, both groups of parisons 20 from the same shot are blown in quick succession so that there is little variance in their characteristics when the blow molding operation is performed. During this interval, the first group of parisons 20 from shot 2 are in the second conditioning station 40b and the second group of parisons 20 from shot two are in the first conditioning station 40a. At the same time, the first group of parisons from a third shot would be transferred to a pallet 36 now located under the robot 22. However, for ease of understanding, the handling of the third shot is not shown in FIGS. 7A to 7D. It is self-evident that each subsequent shot would be handled in like manner to the first two shots.

During this interval, the blow-molding machine, after blowing the article, waits for the robot 22 and injection-molding machine 10 to be in condition to transfer the next set of parisons 20.

After the interval, the blow-mold is unclamped and opened to enable the table 34 to be indexed and the next interval started. This interval lasts 3.5 seconds and enables the second group of parisons 20 from shot two to complete its conditioning at the second conditioning station 40b. This ensures that each group of parisons 20 receives the same amount of conditioning time in the conditioning stations even though one group will spend more time in one conditioning station than the other. During this interval, the first group of parisons 20 from shot two is blown and the blow mold 32 immediately opened to enable the table 34 to be indexed.

Immediately upon indexing of the table 34, the blow mold clamp 38 is closed and the second group of parisons 20 from the second shot is blow-molded into articles. Again, this enables the parisons 20 from both the first and second groups of shot two to be blow molded in quick succession and thereby obviate any problems that would arise if one group of parisons 20 was permitted to sit on the index table 34 for a longer period than the other group.

This last interval of the cycle lasts for 7.5 seconds. It enables the injection molding unit 10 and robot 22 to get into position to transfer the next set of parisons 20 from the next shot. During the latter portion of this interval the blow-molding machine 32 is idle waiting for the robot 22 and injection molding unit 10 to perform their functions.

Figure 8:
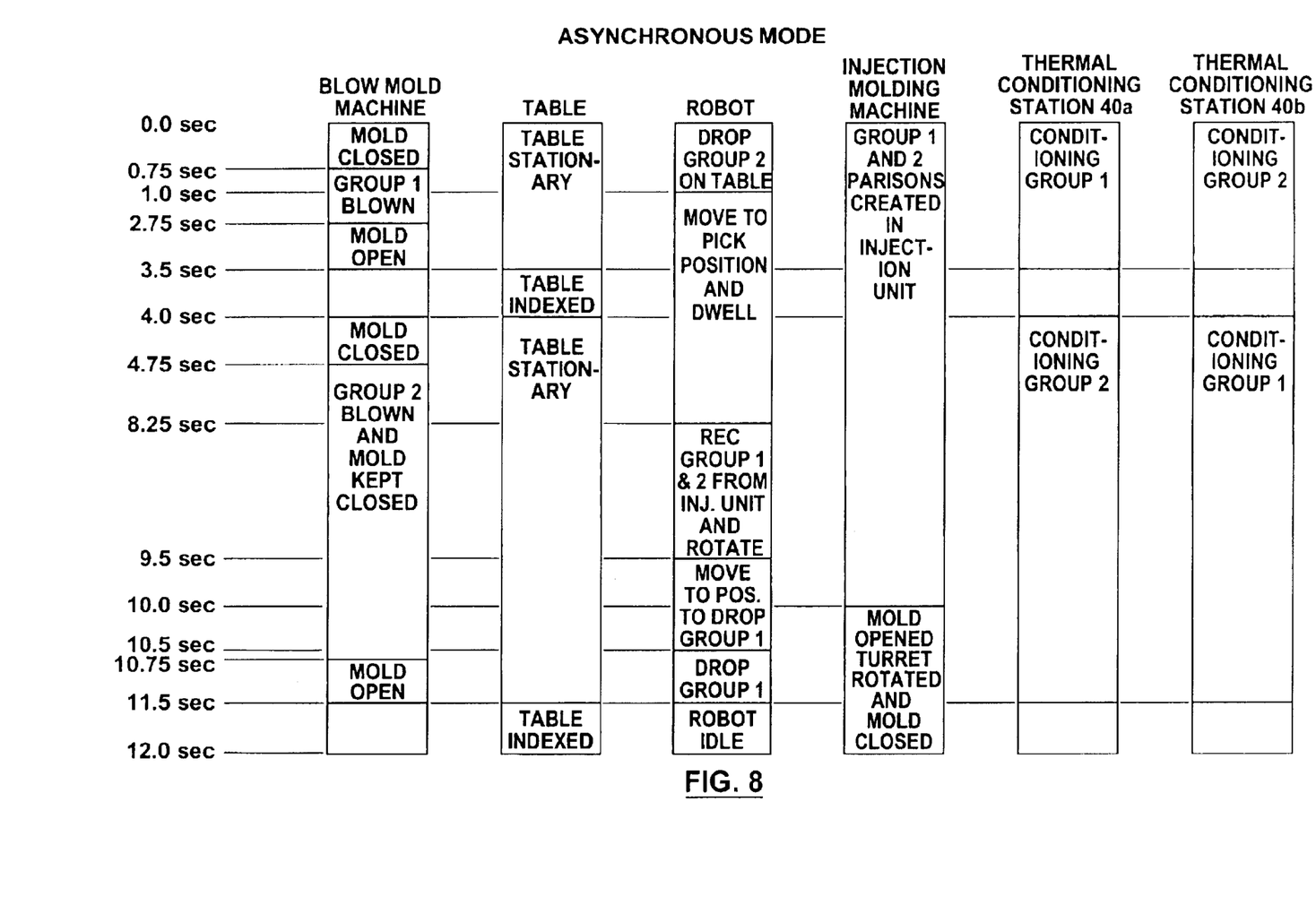
FIG. 8 is a step-by-step operational diagram of the control process for controlling the transfer mechanism for the machine shown in FIG. 1 when operated asynchronously.

FIG. 8 illustrates the blow-mold, conditioning and robot transfer sequence of operations as they occur when the stretch blow molding system is operated in asynchronous mode.

As indicated hereinbefore, the sequence is determined by the length of the injection cycle which, in this present embodiment, is twelve seconds. Accordingly, FIG. 8 illustrates the sequence of operations that would occur during each twelve-second interval.

During a first 3.5 second interval of the cycle, the blow mold clamp 38 is closed and clamped and articles are blown in the blow molding machine 32 and the blow mold clamp 38 is reopened. At the same time, a first group of parisons 20 is conditioned at conditioning station 40a and a second group of parisons 20 from an earlier injection cycle is conditioned at conditioning station 40b. A second group of parisons 20 is transferred from the arm of robot 22 to a pallet 36 at the transfer station 42.

When this 3.5 second interval is completed, the table 34 is indexed so that each group of parisons 20 is moved up one stage on the table 34 and a first group of parisons 20 from a next injection cycle can be placed on the table 34. After indexing, the blow mold clamp 38 is immediately closed and a second group of parisons 20 is blown into articles in the blow-molding machine 32.

During this interval of 7.5 seconds, the blow mold clamp 38 remains closed until just before the table 34 is again ready to be indexed. Alternatively, the blow mold clamp 38 could be opened as soon as the blowing operation is complete.

At this time, both groups of parisons 20 of a first injection cycle have been blown and both groups of parisons 20 of a second injection cycle are at one of the conditioning stations 40a or 40b. In addition, both groups of a third injection cycle are held in tubes 26 on the robot 22 in preparation for dropping onto pallets 36 on the table 34. Accordingly, this is the ideal time to delay indexing the table 34 since both groups of parisons 20 from each injection cycle are being treated in a like manner. In other words, the two groups from the first cycle have been blown into articles, the two groups from the second cycle are being thermally conditioned and the two groups from the third cycle are being held in the robot arm in preparation for transfer to the table.

At the end of this 7.5 second interval, the blow mold clamp 38 is opened, the first group of parisons 20 from an injection cycle is placed on a pallet 36 at the transfer station 42 and the table 34 is then immediately indexed to initiate a shorter 3.5 second interval. During this 3.5-second interval, the blow mold clamp 38 is immediately closed and a second group of parisons 20 from an injection cycle is immediately placed on a pallet 36 at the transfer station 42. At this time, a second group of parisons 20 is at the thermal conditioning station 40b and a first group of parisons 20 is at conditioning station 40a. In this way, each group of parisons 20 is conditioned for the same interval. The first group of parisons 20 of each injection cycle remains in conditioning station 40a for approximately 3.5 seconds and in conditioning station 40b for approximately 7.5 seconds. The second group of parisons 20 from each injection cycle remains in conditioning station 40b for approximately 3.5 seconds and in conditioning station 40a for approximately 7.5 seconds. Accordingly, each group of parisons 20 is in one or the other conditioning station for a total time of approximately 11 seconds of the twelve-second cycle. Furthermore, each group of parisons 20 is placed on the table 34 within an interval that is less than a second. The first group of parisons 20 of an injection cycle is transferred to the table 34 immediately prior to indexing of the table 34 and the second group of parisons 20 of the same injection cycle is transferred immediately after the table 34 has been indexed.

Similarly, the parisons 20 of a first group of an injection cycle are blown immediately before indexing of the table 34 and a second group of parisons 20 from the same injection cycle are blown immediately after indexing of the table 34.

In this way, the interval between blowing of the first and second groups of parisons 20 from a particular injection cycle is reduced to a minimum.

While the invention has been described with reference to particular time intervals, injection cycles and blow molding operations, it should be understood that many other variations could be used in the implementation of the invention.

It is to be understood by persons skilled in the art that the invention is not limited to the illustrations described herein, which are deemed to illustrate the best modes of carrying out the invention, and which are susceptible to modification of form, size, arrangement of parts and details of operation. The invention is intended to encompass all such modifications, which are within its spirit and scope as defined by the claims.

What is claimed is:

1. Apparatus for transferring parisons from an injection molding machine to a blow molding machine, said apparatus comprising:

an indexing table for moving a plurality of parison receiving pallets through a plurality of stations, said stations including a parison receiving station and a blow molding station; said pallets being moved sequentially from station to station in a step-by-step manner, each pallet stopping at each station for a predetermined interval; each said pallet receiving a group of parisons at said receiving station;

means for providing at least two of said groups of parisons to said receiving station during each injection cycle of said injection-molding machine;

means for indexing said table to move said pallets from station to station;

means for transferring a first group of parisons to a pallet during a last portion of a said interval and for transferring a second group of parisons to a pallet during a first portion of a subsequent said interval; and said blow molding station blowing a first group of parisons into blown articles during a last portion of a said interval and blowing a second group of parisons into blown articles during a first portion of a subsequent said interval.

2. Apparatus as defined in claim 1 wherein said intervals are of equal length and are not more than one-half of the cycle time of said injection molding machine.

3. Apparatus as defined in claim 1 wherein said interval for transferring said first group of parisons is shorter than said interval for transferring said second group of parisons.

4. Apparatus as defined in claim 3 wherein said interval for blowing said first group of parisons is determined by the blow cycle time of the blow molding station.

5. Apparatus as defined in claim 1, claim 3 or claim 4 wherein two successive said intervals are substantially equal to the cycle time of said injection molding machine.

6. An article transfer system for an integrated injection molding and blow molding system, said transfer system including:
   a rotatable table;
   a plurality of article carrying means on said table;
   a plurality of stations adjacent said table, said stations including at least an article receiving station, a first conditioning station, a second conditioning station, a blow molding station and a part removal station;
   indexing means for moving said rotatable table to enable each article carrying means to be indexed sequentially into a position cooperative with each said station;
   control means for controlling said indexing means, said control means enabling said indexing means to index said table asynchronously to enable the successive transfer of at least two groups of parts from a single injection cycle onto adjacent article carrying means in a minimal interval and the successive blow molding of at least two groups of parts from a single injection cycle in a minimal interval.

7. A transfer table for an injection stretch blow mold system wherein an injection unit simultaneously injects a plurality of groups of parisons during an injection cycle and a blow molding unit blows a single group of blown articles during a blow molding cycle, said injection molding cycle being longer than said injection cycle by a factor which is greater than or equal to two,
   means for indexing said transfer table through a plurality of stations, said stations including a receiving station for receiving parisons from said injection unit, a blowing station for blowing said parisons into blown articles, at least a first intermediate station between said injection station and said blowing station and at least a second intermediate station between said blowing station and said injection station, and
   means for operating said indexing means asynchronously to enable a pallet on said table to be held at a station for pre-selected intervals, said pre-selected intervals being selected so as to enable each group of parisons to remain in said at least first and second intermediate stations for an aggregate interval of time that is substantially equal for each group of parisons and to enable each group of parisons from a single injection cycle to be moved into said blowing station in rapid succession.

8. In a stretch blow molding system including an injection unit for injecting multiple groups of parisons during a single injection cycle and a blow molding unit for blow molding a single group of said parisons into blow molded articles during a single blow molding cycle, said injection molding cycle being at least twice as long as said blow molding cycle, said system including transfer means for transferring said parisons from said injection unit to said blow molding unit, an improved method for blow molding said parisons, said method comprising the sequential steps of:
   transferring, at a receiving station, a first group of parisons from a first injection cycle onto said transfer means;
   indexing said transfer means to move said first group of parisons away from said transfer station;
   transferring, at said receiving station, a second group of parisons from said first injection cycle onto said transfer means;
   indexing said transfer means to move said second group of parisons from said first injection cycle away from said receiving station;
   indexing said transfer means to move said first group of parisons from said first injection cycle into said blow molding unit and transfer a first group of parisons from a second injection cycle onto said transfer means at said receiving station;
   blow molding said first group of parisons from said first injection cycle;
   indexing said transfer means to move said second group of parisons from said first injection cycle into said blow mold and blow molding said second group of parisons from said first injection cycle, moving said first group of parisons from said second injection cycle away from said receiving station and transferring a second group of parisons from said second injection cycle onto said transfer means at said receiving station;
   indexing said transfer means to move said second group of parisons of said second injection cycle away from said receiving station, to receive a first group of parisons from a third injection cycle at said receiving station; and
   repeating said steps for each subsequent injection shot;
wherein said indexing steps are performed asynchronously so that the second group from each injection cycle is clamped and blown in the blow mold in a minimal period after the first group of parisons from the corresponding injection cycle is blown as determined by the physical limitations of the system.

9. In an injection stretch blowing system comprising an injection unit for injecting a plurality of groups of parisons simultaneously, transfer means for transferring parisons to an index table a group at a time, an index table for transporting said transferred group of parisons through a plurality of stations and a blow molding machine at one of said stations, said blow molding machine simultaneously blowing a single group of said parisons into blown articles, wherein said table is indexed at predetermined times and remains stationary between said predetermined times, an improved parison transfer method comprising the steps of:
   transferring a first group of parisons from a first injection cycle to said table immediately prior to indexing of said table;
   blowing, in said blow molding machine, a first group of parisons from another injection cycle into blown articles immediately prior to indexing of said table;

transferring a second group of parisons from said first injection cycle to said table immediately after indexing of said table; and blowing, in said blow molding machine, a second group of parisons from said another injection cycle into blown articles immediately after indexing of said table.

10. A transfer method as defined in claim 9 wherein time intervals between said predetermined times are substantially equal.

11. A transfer method as defined in claim 9 wherein time intervals between said predetermined times are unequal.

12. A transfer method as defined in claim 10 wherein said interval is approximately one-half of an injection cycle time of said injection unit.

13. A transfer method as defined in claim 11 wherein a first time interval is substantially equal to the cycle time of said blow molding machine and a combined time of said first interval and an immediately subsequent interval is substantially equal to an injection cycle time of said injection unit.

* * * * *